3,200,069
METHOD FOR REMOVING BRANCHED CHAIN
      ALKYLARYLSULFONATES FROM WATER
Hugh R. Eisenhauer, Kingston, Ontario, Canada, assignor
 to E. I. du Pont de Nemours and Company, Wilmington, Del., a corporation of Delaware
No Drawing. Filed Mar. 29, 1963, Ser. No. 269,189
Claims priority, application Great Britain, Jan. 2, 1963,
                         323
              6 Claims. (Cl. 210—63)

This invention relates to the treatment of water effluents and in particular to a method for removing anionic detergents from waste waters such as sewage.

Amongst anionic detergents very common nowadays are alkylarylsulfonates and of these usually the branched chain alkylarylsulfonates. Certain alkylarylsulfonates and in particular the branched chain alkylarylsulfonates are resistant to biological degradation and should, therefore, be eliminated from waste waters in view of their potential harm to fauna or flora, if discharged undecomposed into river waters.

Much effort has in recent years been directed to finding an acceptable way by which to decompose or remove alkylarylsulfonates from waste waters. For example, an article in Chemical and Engineering News, October 29, 1962, indicated that twelve companies are developing processes for use in coin laundries. Most of these processes involve the adsorption of waste detergent on carbon or anion exchange resins, as yet relatively expensive and so commercially not attractive processes to practice for a large scale treatment of waste waters.

"Soft," that is readily biodegradable, anionic detergents such as lauryl sulfate or laurylbenzenesulfonate, but not the "hard" branched chain alkylarylsulfonates, are known to be susceptible to oxidation by means of hydrogen peroxide catalyzed by various metal salts such as cupric or manganous sulfates or ferrous ammonium sulfate. However, this known oxidative treatment is slow and inefficient and was thought to require relatively large amounts of hydrogen peroxide in view of a finding that the oxidative degradation was proportional to the concentration of hydrogen peroxide (M. Chambron and A. Giraud, Bull. Acad. Natl. Med. (Paris, 1960), 144, 631).

It has now unexpectedly been found that alkylbenzenesulfonates including the "hard," that is the biodegradably inert branched chain, alkylbenzenesulfonates may be removed from waste waters rapidly and efficiently by means of hydrogen peroxide under specific reaction conditions. Illustrative of such "hard" alkylbenzenesulfonates are those in which the alkyl substituent chain on the benzene nucleus contains 8 to 16 carbon atoms and includes at least one alkyl side group. It is, of course, known that hydrogen peroxide itself when used in large excess in warm solutions is capable of slowly oxidizing organic compounds of almost all types, but in the main it does seem to react preferentially with organic molecules which are capable of adding on either two hydroxyl groups or a single oxygen atom. It is also known that, in the presence of a trace of a ferrous salt, ice-cold hydrogen peroxide rapidly oxidizes certain unsaturated organic compounds (Fenton's reaction) but that no similar oxidation occurs in the presence of a ferric salt.

According to the present invention, water contaminated with anionic detergent comprising branched chain alkylarylsulfonates is mixed at ordinary atmospheric temperatures and pressures with from 1 to 25 moles of hydrogen peroxide per mole of such detergent in the presence of a metal ion catalyst, and is maintained at a pH of from 3 to 6. From 5 to 15 moles of hydrogen peroxide per mole of such detergent are preferred.

Metal ion catalysts according to the present invention may be ions of any of the transition metals including copper, preferably in a lower valency state. Illustrative of such metal ion catalysts are: $Cu^+$, $Ti^{+++}$, $V^{++++}$, $Co^{++}$ and $Mn^{++}$. Of all these catalysts, the ferrous ion is preferred and may be added to the reaction system in the form of organic or inorganic ionizable salts. Excellent results have been obtained with ferrous ammonium sulfate.

The amount of the metal ion catalyst employed influences the efficiency of the process of the present invention. Amounts of from 4 to 20 moles or more of the metal ion per mole of the branch chain alkylarylsulfonate contaminant are effective, but best results are obtained when the metal ion is present in amounts of from 5 to 15 moles per mole of such contaminant. If the process is practiced in metal tanks or other metallic vessels capable of contributing metal ion catalyst, less of the metal ion need be added to the reaction system.

The control of pH is an important aspect of the present invention. The process of the present invention should in all instances be practiced under acidic conditions, preferably by adjusting the starting pH to about 4. It is inadvisable to allow the pH of the reaction system to drop substantially below 3.

Under certain circumstances it has been found advantageous to repeat the process of the present invention with waste water already treated by the process. When the water to be treated contains a substantial amount of a phosphate in addition to the alkylarylsulfonate contaminant, it may also be advantageous, although not essential, to pretreat the water to remove all or part of the phosphate. Such preliminary removal of phosphate can be accomplished by treating the water with a soluble iron salt such as ferric sulfate or nitrate, or ferrous sulfate or ammonium sulfate. The purpose is to precipitate the phosphate which is separated, e.g., by filtration. Such removal of the phosphate in precipitated form will generally effect removal of a substantial amount of the alkylarylsulfonate along with the phosphate, thereby reducing the amount of hydrogen peroxide and catalyst required in the subsequent treatment in accordance with the invention. When practicing such pretreatment, the amount of the soluble iron salt used should be sufficient to precipitate all or at least a substantial part of the phosphate present. An amount greater than that required to precipitate all of the phosphate can be used.

The process of the present invention may be practiced in both closed and open systems, that is, for example, in special reaction vessels or in open tanks such as are encountered in sewage disposal plants.

The following examples serve to illustrate the present invention further.

EXAMPLE I

Four hundred parts of water containing 50 p.p.m. alkylbenzenesulfonate (which was dodecylbenzenesulfonate containing three methyl side groups in the dodecyl moiety) were adjusted to pH 4 with dilute sulfuric acid. To this solution was added 1.36 parts of a ten percent by weight aqueous solution of ferrous ammonium sulfate $Fe(NH_4)_2(SO_4)_2 \cdot 6H_2O$, and 1.76 parts of a one percent by weight hydrogen peroxide solution. The reaction temperature was 20° C. After 30 minutes reaction, the alkylbenzenesulfonate concentration had decreased to 5.2 p.p.m. After six hours reaction, the alkylbenzenesulfonate concentration was 2.7 p.p.m. and after twenty-four hours it was 0.6 p.p.m.

EXAMPLE II

When the reaction of Example I was conducted at pH 6, the alkylbenzenesulfonate concentration decreased to 2.1 p.p.m. in 30 minutes.

EXAMPLE III

When the reaction of Example I was conducted at 40° C., the alkylbenzenesulfonate concentration decreased to 6.2 p.p.m. in 30 minutes. At a reaction temperature of 60° C., the alkylbenzenesulfonate concentration was 8.3 p.p.m. after 30 minutes reaction.

EXAMPLE IV

Four hundred parts of water containing 10 p.p.m. of the alkylbenzenesulfonate of Example I were adjusted to pH 4 with dilute sulfuric acid. To this solution was added 0.27 part of a ten percent by weight aqueous solution of ferrous ammonium sulfate and 0.35 part of one percent aqueous hydrogen peroxide. The reaction temperature was 20° C. After 30 minutes, six hours and twenty-four hours reaction, the alkylbenzenesulfonate concentrations were 1.7, 1.1 and 0.75 p.p.m., respectively.

EXAMPLE V

Four hundred parts of water containing 50 p.p.m. of the alkylbenzenesulfonate of Example I were adjusted to pH 4 with dilute sulfuric acid. To this solution at 20° C. was added 0.165 part of ferric ammonium sulphate, $FeNH_4(SO_4)_2 \cdot 12H_2O$. After ten minutes the mixture was filtered and analyzed. The alkylbenzenesulfonate concentration was 25.7 p.p.m. The filtrate was then treated with 0.070 part of ferrous ammonium sulfate and 0.91 part of a one percent aqueous solution of hydrogen peroxide. After reaction times of 30 minutes, six hours and twenty-four hours, the alkylbenzenesulfonate concentrations were 4.3, 1.7 and 0.20 p.p.m., respectively.

EXAMPLE VI

The reaction of Example I was conducted for thirty minutes whereupon the mixture was filtered. To the filtrate was added 0.27 part of a ten percent aqueous solution of ferrous ammonium sulfate and 0.35 part of a one percent aqueous solution of hydrogen peroxide. After an additional thirty minutes and three and one-half hours' reaction time (total reaction times were therefore one and four hours) the alkylbenzenesulfonate concentration had decreased to 1.5 and 0.53 p.p.m., respectively.

EXAMPLE VII

Four hundred parts of water containing 0.08 gm. of commercial detergent marketed by the Procter & Gamble Co. under the trademark "Tide" were adjusted to pH 3.3. The solution contained 34.5 p.p.m. branched chain alkylbenzenesulfonate and was shown to contain phosphate. When this solution was treated with 0.94 part of a ten percent aqueous solution of ferrous ammonium sulfate and 1.22 parts of a one percent aqueous solution of hydrogen peroxide for twenty-four hours at 20° C. the alkylbenzenesulfonate concentration decreased to 3.0 p.p.m.

EXAMPLE VIII

Five hundred parts of an aqueous solution of the commercial detergent of Example VII containing 100 p.p.m. of the branched chain alkylbenzenesulfonate were treated with an aqueous solution containing 7.46 percent ferric sulfate, $Fe_2(SO_4)_3$. After 2.41 parts of this solution had been added, a gelatinous precipitate began to deposit in the detergent solution. The mixture was allowed to stand for fifteen minutes and was then filtered. The filtrate had a pH of 3.3, an alkylbenzenesulfonate content of 35.9 p.p.m. and contained only a trace of phosphate. When this solution was then treated by the method of Example VII for twenty-four hours, the alkylbenzenesulfonate concentration decreased to 0.7 p.p.m.

EXAMPLE IX

Four hundred parts of a laundry effluent containing a commercial detergent were analyzed and found to contain phosphate and 113 p.p.m. of branched chain alkylbenzenesulfonate. This was treated by the method of Example I at 20° C. and pH 4 using four moles of ferrous ammonium sulfate and six moles of hydrogen peroxide per mole of alkylbenzenesulfonate for one hour. After this treatment the alkylbenzenesulfonate concentration had decreased to 98 p.p.m.

EXAMPLE X

A second laundry effluent similar to that of Example IX contained phosphate, 24.6 p.p.m. available chlorine from commercial bleach and 202 p.p.m. branched chain alkylbenzene sulfonate Two hundred parts of this effluent were treated with one mole of sodium sulphite per mole of hypochlorite The effluent, now free of available chlorine, was treated by the method of Example I with ten moles of ferrous ammonium sulfate and fifteen moles of hydrogen peroxide per mole of alkylbenzenesulfonate at 20° C. and pH 3.5. After one hour reaction, the alkylbenzenesulfonate concentration was 3.5 p.p.m. and after four hours it was 1.7 p.p.m.

EXAMPLE XI

Two hundred parts of the laundry effluent of Example IX were treated with 2.57 parts of an aqueous solution containing 7.46% ferric sulfate. After standing for fifteen minutes, the mixture was filtered. The filtrate, which now contained 36.5 p.p.m. alkylbenzenesulfonate and only a trace of phosphate, was treated at 20° C. with 0.083 part of ferrous ammonium sulfate and 1.07 parts of a one percent solution of hydrogen peroxide. After one hour, the alkylbenzenesulfonate concentration had decreased to 6.1 p.p.m.

EXAMPLE XII

The laundry effluent of Example X free of hypochlorite was treated with ferric sulfate solution by the method of Example XI. Five hundred parts of the effluent required the addition of 0.473 part of ferric sulfate before precipitation occurred. The filtrate, which contained only a trace of phosphate, had a pH of 3.5 and an alkylbenzenesulfonate concentration of 54.7 p.p.m. It was then treated by the method of Example I with six moles of ferrous ammonium sulfate and nine moles of hydrogen peroxide per mole of alkylbenzenesulfonate. After 30 minutes, six hours and twenty-four hours' reaction, the alkylbenzenesulfonate concentrations were 13.0, 9.9 and 8.8 p.p.m., respectively.

The ferric sulfate-pretreated effluent was also reacted with ten moles of ferrous ammonium sulfate and fifteen moles of hydrogen peroxide per mole of alkylbenzenesulfonate. After 30 minutes, six hours and twenty-four hours, the alkylbenzenesulfonate concentrations were 6.5, 5.5 and 2.6 p.p.m., respectively.

EXAMPLE XIII

Treated sewage from a primary (settling) sewage disposal plant contained 1.64 p.p.m. branched chain alkylbenzenesulfonate. Four samples each containing two hundred parts of this treated sewage, were adjusted to pH 4.0 with dilute sulfuric acid. The samples were then treated at room temperature with ferrous ammonium sulfate, 0.0022, 0.0045, 0.0089 and 0.0178 part, respectively; and with a 0.1 percent aqueous solution of hydrogen peroxide, 0.29, 0.58, 1.16 and 2.32 parts, respectively. After twenty-four hours, the alkylbenzenesulfonate concentrations were 0.87, 0.394, and 0.074 and 0.008 p.p.m., respectively.

EXAMPLE XIV

The primary sewage of Example XIII was enriched with the alkylbenzenesulfonate of Example I to a total alkylbenzenesulfonate concentration of 43.4 p.p.m. This solution was treated with six moles of ferrous ammonium sulfate and nine moles of hydrogen peroxide per mole of alkylbenzenesulfonate by the method of Example 1. After reaction times of 30 minutes, six and twenty-four hours, the alkylbenzenesulfonate concentrations had decreased to 4.6, 2.2 and 0.7 p.p.m., respectively.

EXAMPLE XV

A sample of treated sewage, from a disposal plant having both primary (settling) and secondary (activated sludge) sewage treatment facilities, had a branched chain alkylbenzenesulfonate content of 3.04 p.p.m. This treated sewage was reacted with various amounts of ferrous ammonium sulfate and hydrogen peroxide by the method of Example XIII. The results are tabulated in Table I.

*Table I*

TREATMENT OF SECONDARY SEWAGE OUTFALL

| Reagents, Parts Per 100 Parts of Sewage | | Alkylbenzenesulfonate, p.p.m. | |
|---|---|---|---|
| $Fe(NH_4)_2(SO_4)_2 \cdot 6H_2O$ | 0.10% Aqueous $H_2O_2$ | After 4 hours Reaction | After 24 hours Reaction |
| 0 | 0 | 3.04 | 3.04 |
| 0.0021 | 0.27 | 1.87 | 1.42 |
| 0.0042 | 0.54 | 0.96 | 0.49 |
| 0.0083 | 1.07 | 0.036 | 0.025 |
| 0.0166 | 2.14 | 0.012 | 0.023 |

The embodiments of the invention in which an exclusive property or privilege is claimed are defined as follows:

1. The method of removing a branched chain alkylbenzenesulfonate contaminant from water comprising treating water contaminated with a branched chain alkylbenzenesulfonate with 1 to 25 moles of hydrogen peroxide per mole of said contaminant at a pH of 3 to 6 and in the presence of 4 to 20 moles of ferrous ion per mole of said contaminant.

2. The method of claim 1 wherein said contaminant is a branched chain dodecylbenzenesulfonate.

3. The method of claim 2 employing from 5 to 15 moles of hydrogen peroxide per mole of said contaminant in the presence of from 5 to 15 moles of ferrous ion per mole of said contaminant.

4. The method of removing a branched chain alkylarylsulfonate contaminant from water comprising treating water contaminated with a branched chain alkylarylsulfonate with 1 to 25 moles of hydrogen peroxide per mole of said contaminant at a pH of 3 to 6 and in the presence of 4 to 20 moles of ferrous ion per mole of said contaminant.

5. The method of removing a branched chain alkylarylsulfonate contaminant from water containing said contaminant and a dissolved phosphate, said method comprising adding a soluble iron salt to the contaminated water to precipitate iron phosphate, then treating the water at pH 3 to 6 with 1 to 25 moles of hydrogen peroxide and 4 to 20 moles of ferrous ion per mole of said contaminant.

6. The method of purifying water containing as contaminants a branched chain alkylarylsulfonate and a dissolved phosphate, said method comprising adding a soluble ferric salt to the contaminated water whereby to precipitate ferric phosphate, filtering out said ferric phosphate precipitate and treating the resulting filtrate at a pH of 3 to 6 with 1 to 25 moles of hydrogen peroxide and 4 to 20 moles of ferrous ion per mole of said branched chain alkylarylsulfonate present in said filtrate.

References Cited by the Examiner

Chambron et al.: Bull Acad. Natl. Med. (Paris), 144, pp. 631–6 (1960).

Abrams et al.: Removal of ABS From Water by Chloride Cycle Anion Exchange, Jour. AWWA, vol. 54, May 1962, pp. 537–543.

MORRIS O. WOLK, *Primary Examiner.*